A. E. VINCENT.
MACHINE FOR MANUFACTURING PNEUMATIC TIRES.
APPLICATION FILED JAN. 8, 1907.
906,588.
Patented Dec. 15, 1908.
2 SHEETS—SHEET 1.
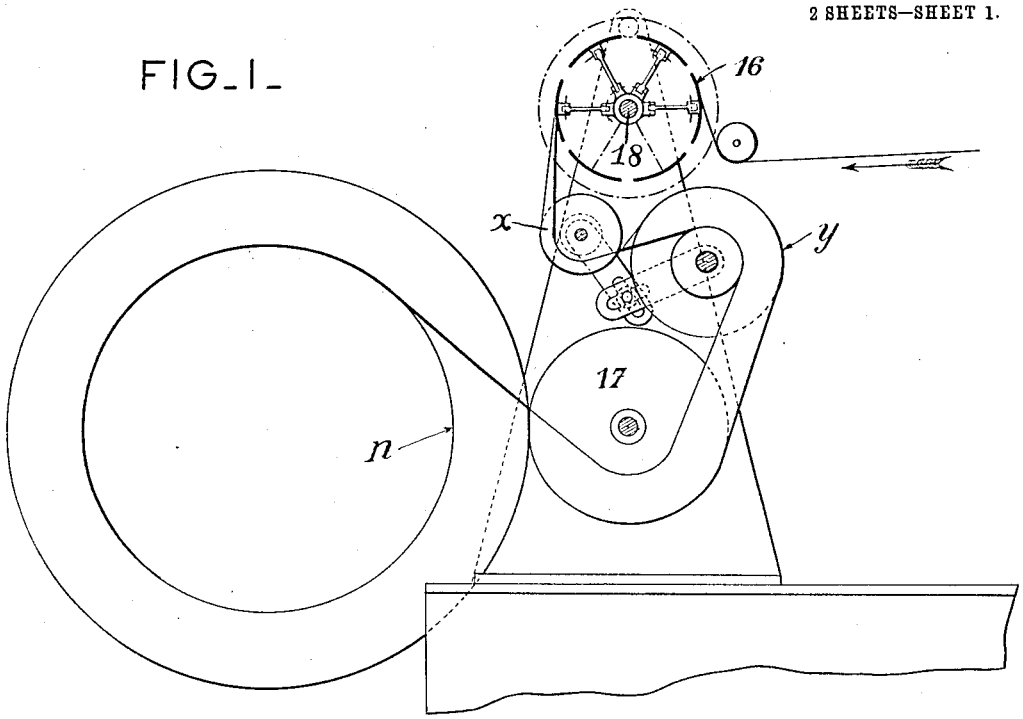
FIG_1_
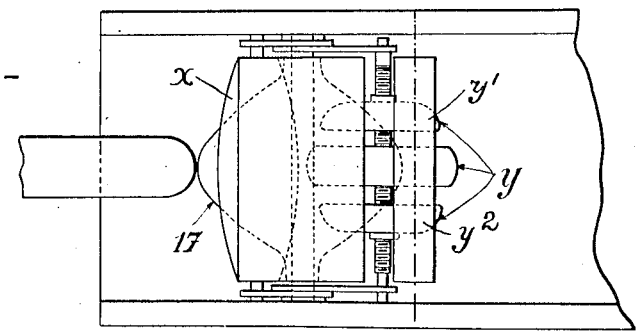
FIG_2_
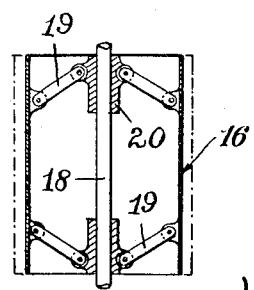
FIG_3_
WITNESSES
Alvin S. White
W. P. Burk
INVENTOR
Amédée Etienne Vincent
BY
ATTY A. E. VINCENT.
MACHINE FOR MANUFACTURING PNEUMATIC TIRES.
APPLICATION FILED JAN. 8, 1907.
906,588.
Patented Dec. 15, 1908.
2 SHEETS—SHEET 2.
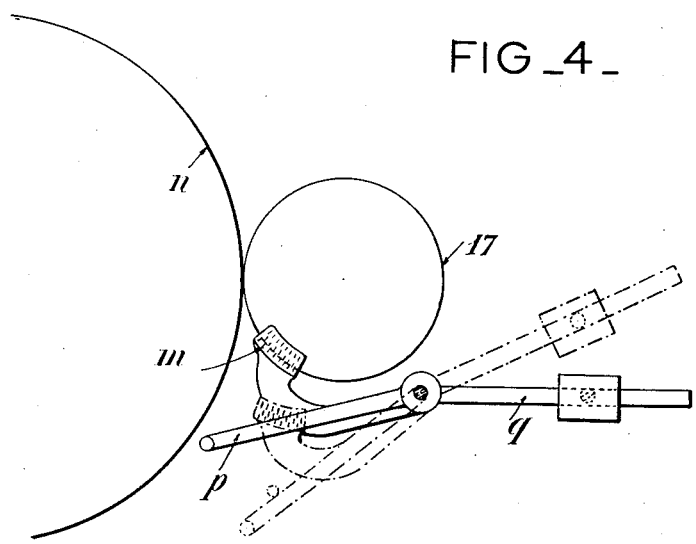
FIG_4_
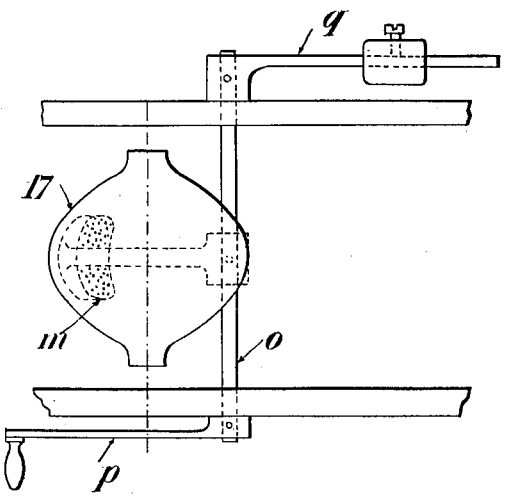
FIG_5_
WITNESSES
INVENTOR
Amédée Etienne Vincent
BY
ATTY

UNITED STATES PATENT OFFICE.

AMÉDÉE ETIENNE VINCENT, OF NOISY-LE-SEC, FRANCE.

MACHINE FOR MANUFACTURING PNEUMATIC TIRES.

No. 906,588.            Specification of Letters Patent.            Patented Dec. 15, 1908.

Application filed January 8, 1907. Serial No. 351,392.

*To all whom it may concern:*

Be it known that I, AMÉDÉE ETIENNE VINCENT, civil engineer, citizen of France, residing at 8 Rue Chanzy, Noisy-le-Sec, Seine, France, have invented new and useful Improvements in Machines for Manufacturing Pneumatic Tires, of which the following is a specification.

This invention relates to improvements in the machine forming the subject of Letters Patent No. 794,473.

The invention is intended primarily to permit the application of a system of shaping and preliminarily tensioning the rubber coated fabrics to all the diameters and shapes of pneumatic tires as well as to all rubber goods and fabrics in whatever way or to whatever extent the rubber is applied and whatever their resistance and their elasticity. This result is insured by a special arrangement of stretching and shaping devices placed in front of the large finishing matrix or shaping core on which the tire is formed which arrangement enables simultaneously the certain and progressive regulation, even while in operation of the tension of the canvas or the rubber of forming successively the preliminary shape and modifying, according to circumstances the profile or profiles of this preliminary shape.

The improvement further consists in an apparatus which prevents the recoil of the stretching and shaping devices under the reaction of the fabric, between two stages of manufacture and which permits of giving to the canvas the required tension at the commencement of its manufacture.

In the annexed drawings, Figures 1 to 3 illustrate by way of example an embodiment of the apparatus including the shaping and stretching devices. Fig. 1 is an elevation of the complete arrangement, Fig. 2 is a plan and Fig. 3 is a detail in section. Figs. 4 and 5 show in elevation and in plan the means for preventing recoil.

Referring to Figs. 1 to 3, it will be seen that in order to vary the tension of the rubber fabric, even while in operation, it suffices to pass this fabric, before it arrives at the matrix $n$, on an extensible stretching roller 16 constituted for example of a certain number of equal segments; these segments may be simultaneously brought towards or away from the axis of rotation 18, each of them being carried on two oblique symmetrical double hinged links 19, as seen best in Fig. 3. All the links on the same side constitute an arrangement similar to the frame of an umbrella and are jointed similar to the ribs of the said frame on one socket 20. In moving the socket support to or from the middle of the axis, one opens or closes, more or less, the roller, the periphery of which is in reality a regular polygon with curved edges. The extension of the stretching roller may be obviously realized by any other mechanical arrangement, and in each case the relation of the diameter of the end rollers of the stretching-shaping apparatus being modified because the one of these diameters is always fixed while the other varies, the regulation of the tension will be assured.

To vary, according to the case, the profile or profiles of the preliminary shape, there is employed one or more rollers $x$ and $y$ of adjustable curvature. In the drawings only one of these rollers is illustrated as being adjustable, the roller $x$ being of permanent shape. The roller $y$ is constituted of a central bulbed roller and by other rollers $y^1$ and $y^2$ of smaller diameter which may be brought towards or from the central roller $y$ at will. The position of the intermediary axes can be regulated at will and the curves of these rollers are designed to give the progressive shaping. It will be thus seen that by means of the bulbed rollers of adjustable curvature, the apparatus permits of varying as much as desired the radius of the curves of the surfaces of the shaped fabrics.

By the combination of the means which have been described there may be thus satisfied all the conditions of manufacture of all diameters and profiles of pneumatic tires and for all qualities of fabric or rubber.

Figs. 4 and 5 show an arrangement by means of which the fabric may be applied at any desired moment on the last shaping roller 17 to prevent the recoil of said fabric when a traction is no more exerted upon it. This arrangement may comprise if desired a concave block $m$ of suitable curvature or a concave roller which is applied on the shaper at a given moment in such a manner that the fabric is held between the shaper 17 and the block. The block or concave roller is furnished with spikes etc. the action of which prevents slip. The shaper 17 in this case is smooth. Alternatively, the spikes may be formed on the shaper, the block or concave roller being then smooth. Following the arrangement in the drawing, the block $m$ forms the end of an oscillating lever keyed on the shaft o parallel to the other shafts of the stretching shaping system. This shaft may turn through a suitable angle and be manually operated for example by means of a hand lever p: another lever q fixed on the shaft o and bearing an adjustable counterpoise permits of the easy balancing of all these devices and may be held in the raised position by means of a stop.

Having now described my invention, what I claim as new and desire to secure by Letters Patent is:

1. In a machine for manufacturing pneumatic tires, means for shaping and tensioning the rubber fabric comprising an extensible stretching roller, intermediary bulbed rollers mounted on adjustable axes parallel to the end rollers, and bulbed rollers of adjustable curvature constituted of a central bulbed roller and of other rollers of much smaller diameter which may be brought towards or from the central roller substantially as described and for the purpose set forth.

2. In a machine for manufacturing pneumatic tires, means for shaping and tensioning the rubber fabric comprising an extensible stretching roller, intermediary bulbed rollers mounted on adjustable axes parallel to the end rollers, bulbed rollers of adjustable curvature constituted of a central bulbed roller of much smaller diameter which may be brought towards or from the central roller, a concave block provided with spikes adapted to be applied on the shaper, an oscillating lever on which said block is mounted, and operative means connected to said oscillating lever and adapted to apply the block on the shaper, substantially as described and for the purpose set forth.

In testimony whereof I have signed my name to this specification in the presence of two subscribing witnesses.

AMÉDÉE ETIENNE VINCENT.

Witnesses:
ANTOINE LAVOIE,
HANSON C. COXE